United States Patent
Wu

(10) Patent No.: US 11,262,226 B2
(45) Date of Patent: Mar. 1, 2022

(54) HYBRID MASS FLOW SENSOR INCLUDING A THERMAL AND CORIOLIS PRINCIPLE MEASUREMENT ARRANGEMENTS

(71) Applicant: Guanghua Wu, McKinney, TX (US)

(72) Inventor: Guanghua Wu, McKinney, TX (US)

(73) Assignee: GWU Design

( * ) Notice: Subject to any disclaimer, the term of this patent is extended or adjusted under 35 U.S.C. 154(b) by 76 days.

(21) Appl. No.: 16/792,380

(22) Filed: Feb. 17, 2020

(65) Prior Publication Data

US 2021/0255013 A1  Aug. 19, 2021

(51) Int. Cl.
*G01F 1/84* (2006.01)
*G01F 1/68* (2006.01)

(52) U.S. Cl.
CPC .......... *G01F 1/8472* (2013.01); *G01F 1/8422* (2013.01); *G01F 1/8436* (2013.01); *G01F 1/68* (2013.01)

(58) Field of Classification Search
None
See application file for complete search history.

(56) References Cited

U.S. PATENT DOCUMENTS

| | | | |
|---|---|---|---|
| 1,601,513 A | 9/1926 | Stoekle et al. | |
| 2,594,618 A | 4/1952 | Booth | |
| 2,953,022 A | 9/1960 | Laub | |
| 2,994,222 A | 8/1961 | Laub | |
| 3,056,295 A | 10/1962 | Laub | |
| 3,650,151 A | 3/1972 | Drexel | |
| 3,938,384 A | 2/1976 | Blair | |
| 4,517,838 A | 5/1985 | Wachi et al. | |
| 4,815,280 A | 3/1989 | Tujimura et al. | |
| 5,191,793 A | 3/1993 | Drexel et al. | |
| 5,497,666 A | 3/1996 | Patten et al. | |
| 5,763,774 A | 6/1998 | Ha et al. | |
| 6,446,504 B1 | 9/2002 | Maginnis, Jr. | |
| 6,728,813 B1 | 6/2004 | Barger et al. | |
| 6,769,301 B2 | 8/2004 | Barger et al. | |
| 7,021,136 B2 | 4/2006 | Vincze et al. | |
| 7,117,751 B2 | 10/2006 | Berger et al. | |
| 7,168,329 B2 | 1/2007 | Bell et al. | |
| 7,628,084 B2 * | 12/2009 | Schlosser | G01F 1/8436 73/861.355 |
| 7,895,905 B2 * | 3/2011 | Lammerink | G01F 1/6888 73/861.355 |
| 7,971,480 B2 | 7/2011 | Smirnov | |
| 8,881,601 B2 * | 11/2014 | Lammerink | G01F 25/003 73/861.01 |
| 9,395,224 B2 | 7/2016 | Rao et al. | |
| 10,274,353 B2 | 4/2019 | Critchley et al. | |

(Continued)

OTHER PUBLICATIONS

Lammerink et al., Single Chip flow sensing system with a Dynamic flowr ange of more than 4 decades; 2011, IEEE, pp. 890-893.*

*Primary Examiner* — Harshad R Patel

(57) ABSTRACT

A U-shaped tube is used to measure the mass flow rate of the fluid using both thermal method and the Coriolis principle simultaneously. Two resistant coils are wound on the tube to do the thermal measurement and an excitation coil and two optical sensors are used to do the Coriolis flow measurement. It takes the advantages of both technologies and create a flow sensor which is super accurate, gas type insensitive, long-term stable and fast responsive without too much pressure drop.

1 Claim, 18 Drawing Sheets

(56) References Cited

U.S. PATENT DOCUMENTS

| | | |
|---|---|---|
| 10,514,289 B2 | 12/2019 | Ikeuchi et al. |
| 2006/0243067 A1* | 11/2006 | Mehendale ........... G01F 1/8409 73/861.355 |
| 2010/0163119 A1 | 7/2010 | Isobe et al. |

* cited by examiner

HYBRID MASS FLOW SENSOR INCLUDING A THERMAL AND CORIOLIS PRINCIPLE MEASUREMENT ARRANGEMENTS

FIELD OF THE INVENTION

The present invention is related to a mass flow sensor combining the technologies of thermal flow measurement and Coriolis flow measurement, specially targeting gas applications.

BACKGROUND OF THE INVENTION

Thermal mass flow sensors are based on the thermal cooling effect of the flowing fluid. They usually use one or more heated sensing element(s), placed in the vicinity or inside of the flow path, by measuring the temperature change of the element(s) caused by cooler fluid to decide the flow rate. The major advantages of thermal flow sensors are:
  high sensitivity—this technology can detect very subtle flow;
  low pressure drops—during measuring, the pressure drops of the flow tube carrying fluid is low.
They are also having many disadvantages:
  Slow response—it usually takes seconds to balance to a new temperature, with different response acceleration algorithms, the response time can be shortened to several hundred milliseconds, but it may still not satisfy some applications, such as the mass flow controllers used in semiconductor business;
  Medium dependency—as the heat transfer relies mainly on the heat transfer properties of the medium, medium change will demand either the sensor to be recalibrated or some kind of conversion to be used and it can be tedious and error-prone. These make it arduous for one sensor works for more than one medium;
  Long term stability—as the accuracy of thermal flow sensors is related to the heat transfer between the gas and the sensing elements, the aging of the heat isolation materials and adhesives, the formation of a deposition layer on the inner wall surface of the tube by medium will cause a gradual change to the sensor output with the time;
  Narrow range and bad linearity—heat transfer is not linear with the flow rate and will get saturated when the flow rate reaches to a certain level. This makes the delicate linearization during sensor calibration necessary and still be an error source. The saturation will limit the flow range.

Coriolis flow sensors are based on the Coriolis principle, that is when a mass moving in a rotating system, Coriolis force will be produced. Coriolis flow sensor have these advantages:
  Accurate—Coriolis technology measures the mass directly, typically the accuracy can reach ±0.2% (compare with ±1% for the thermal sensors);
  Fluid insensitive—for the same reason, the mass is directly measured, no matter what fluid is flowing, or it is liquid or gas;
  Good range—the up limit of the flow range is basically up to the allowed pressure drop;
  Fast response—the response time is in millisecond level;
  Good long-term stability—theoretically, there is no measuring factor changing with the time;
  Good linearity—the relationship between the sensor output and the flow rate is a perfect straight line. This makes the calibration very easy, most of the time, only one-point calibration will be enough.

Coriolis flow sensor also has its limitation, a major one is the difficulty to use them in gas applications stemmed from the low density of gases. First, the pressure drop will be too high. For example, for a Coriolis flow meter, with a 1000 g/h (gram per hour) full flow, the pressure drop is about 14.7 psi when flowing water, it will be 145 psi when flowing Nitrogen, this will be too high for many applications. If the 14.7 psi pressure drop is kept, the full flow rate will be around 100 g/h or 1330 sccm (standard cubic centimeter per second). The size of the flow tube can be increased to reduce the pressure drop, but this will make the size of the flow sensor too big. Another issue is the minimum detectable mass flow rate or resolution. For example, a Coriolis sensor with a full flow rate of 1000 g/h may have a 1 g/h minimum detectable mass flow rate, although this is superior when measuring liquid, but when the sensor is used to measure Nitrogen, due to the full flow rate is much lower, the resolution may not be enough. Also, the absolute value of 1 g/h (or 13.3 sccm) may be too high for many applications, some application even requires a full flow rate of 10 sccm.

From the analysis above, it can be seen that the two flow measuring technologies have almost opposite characteristics, if there is a way to combine two technologies together, so their advantages will be utilized and the disadvantages will be compensated, it will make a perfect mass flow sensor. This is the object of this invention.

SUMMARY OF THE INVENTION

In this disclosure, thermal technology and Coriolis technology are combined together to form a flow measurement element, a flow tube, to fully take advantages of both technologies. On the measuring element, two coils are wound to do the thermal flow measurement; a magnetic disk is also glued to the tube, with the aid of nearby excitation coil and motion monitoring optical sensors, the Coriolis flow measurement is implemented. The results from the thermal measurement will be combined with the Coriolis measurement results to cover the whole flow range.

DETAILED DESCRIPTION OF THE INVENTION

Figure 1:
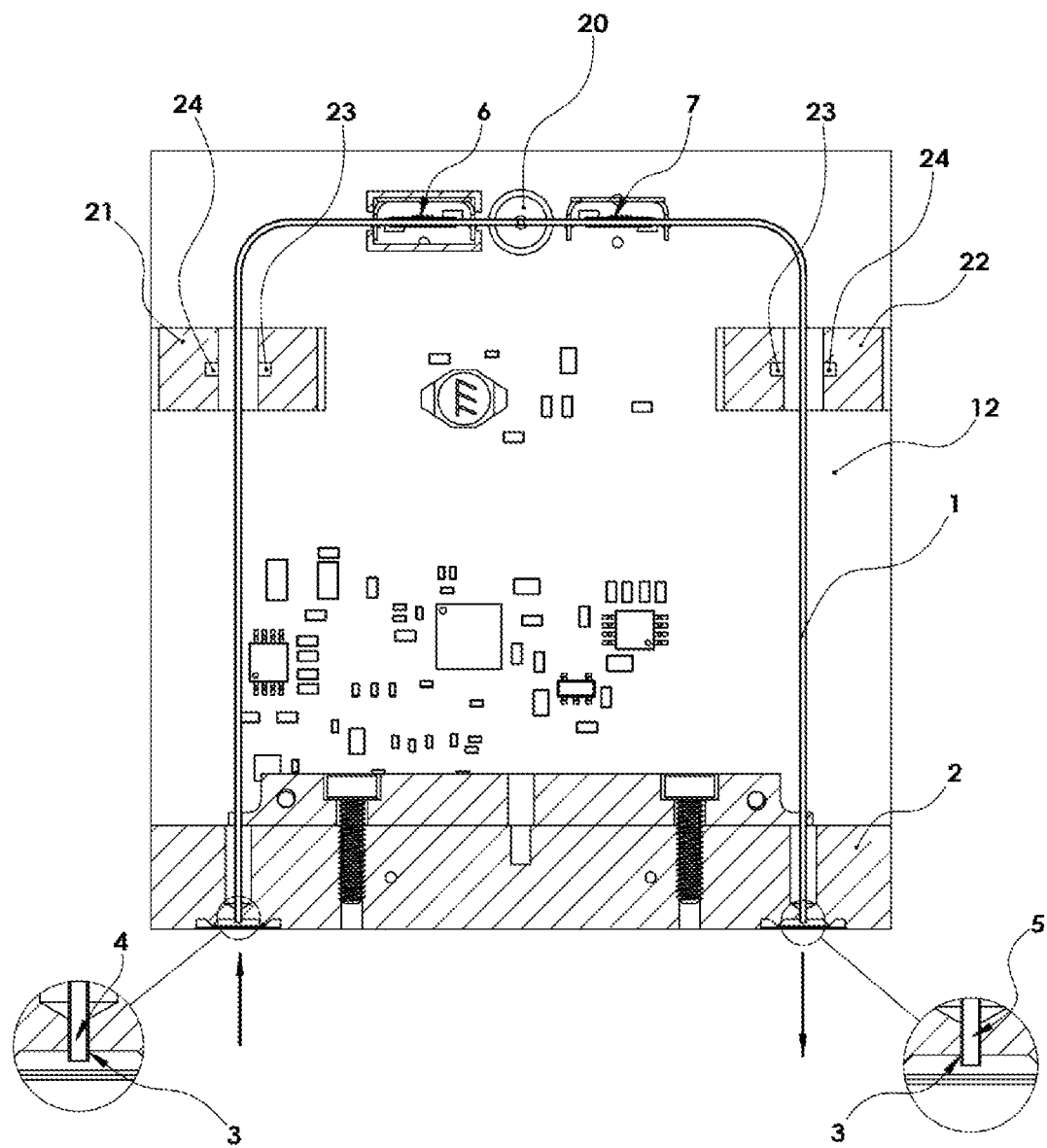
FIG. 1 is a section view of one embodiment of this invention.

FIG. 1 is a section view of one of the embodiments of this invention. Conduit or flow tube 1 made of 316L is laser-welded to base plate 2 at locations 3 to provide an air-tight connection. The whole sensor will be mounted to the base of a mass flow meter or controller (not shown here, the mounting holes can be seen in FIGS. 2 and 4). Fluid flows in via inlet 4 and exits via outlet 5. Upstream coil 6 and downstream coil 7 are wound on the top section of tube 1. The coils are wound with high resistance wire made of Ni—Fe alloy to maximize the resistance change under the temperature change.

Figure 2:
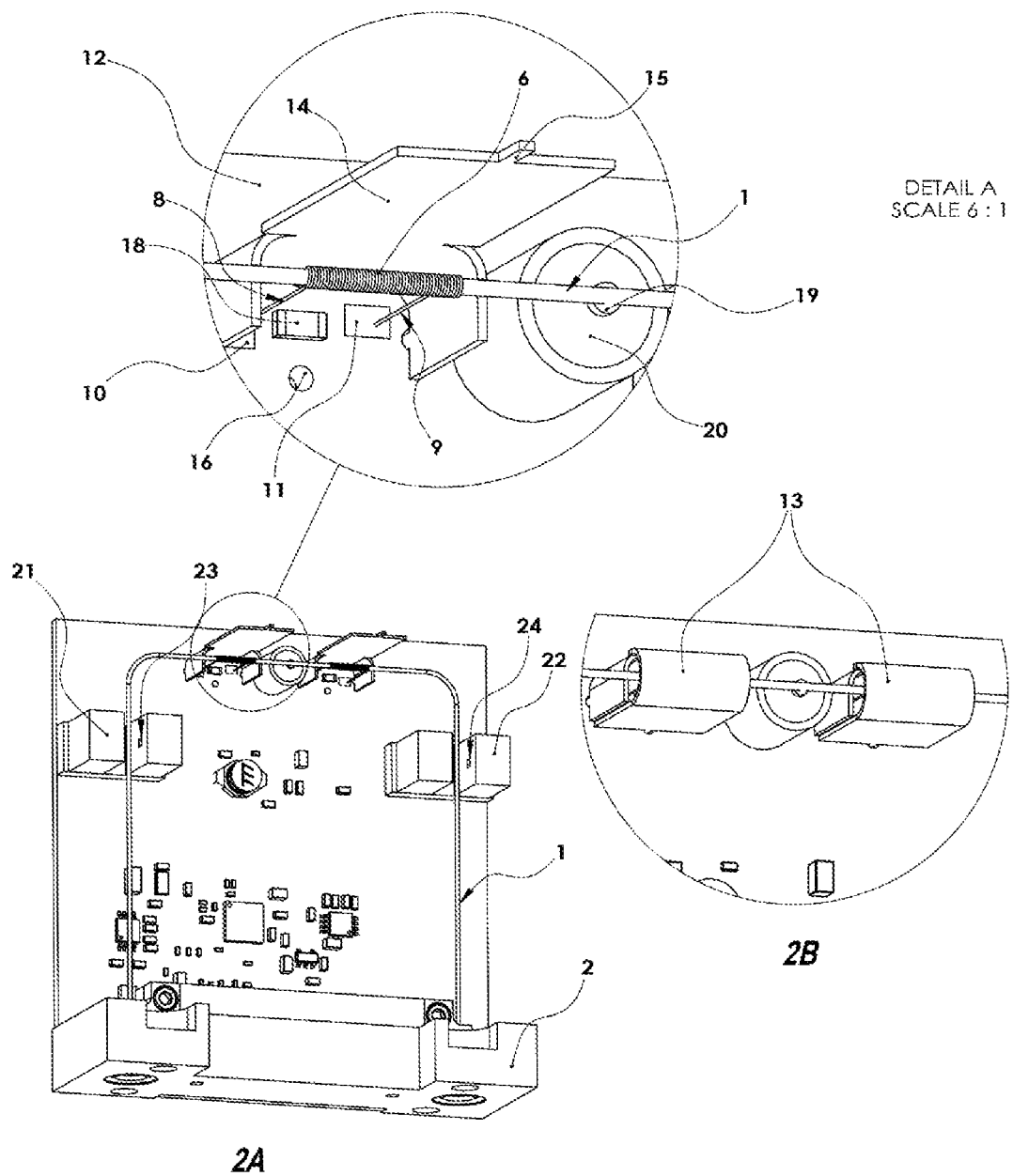
FIG. 2 is a perspective view of this invention.
Figure 3:
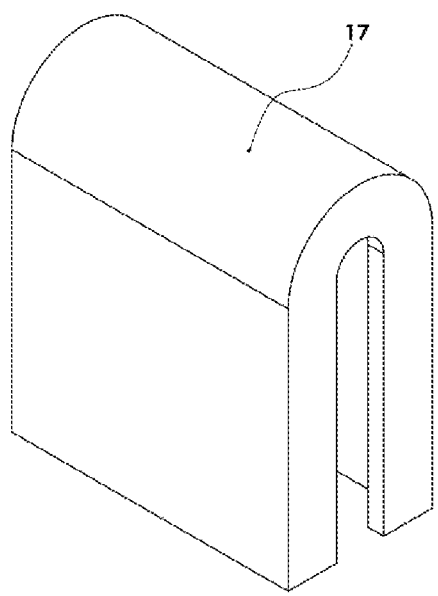
FIG. 3 is a perspective view of the coil cover.

FIG. 2 is a perspective view of this embodiment of the invention. On the top of this figure is a detail view around upstream coil 6 (downstream coil 7 is constructed the same way). Coil 6 has two leads 8 and 9, spot-welded or soldered to two pads 10 and 11 on PCB 12. Both coils 6 and 7 have cover 13, a sheet metal part, preferred being made of Aluminum or non-magnetic stainless-steel sheet. Covers 13 showing on FIG. 2A are in their open status or a mid-step status during installation. Before PCB 12 is installed to sensor base plate 2, covers 13 have been installed on PCB by inserting their three of four tabs into the three holes on PCB 12, then soldered to fix the covers for now. After sensor tube 1 installed, two lead wires 8 and 9 will be connected to pads 10 and 11, then the top part 14 of cover 13 will be bent, the fourth tab 15 of cover 13 will be inserted into hole 16 and soldered from the back of PCB to fix the whole cover. The installed covers are shown in FIG. 2B. The purpose of covering the coils with the covers is to create small environments around the coils and keep the heat transfer stable. Air itself is a good isolator, but the convection of free air flow will make the heat transfer unstable, should be avoided. To make a better sealing and isolation, two plastic covers 17 (FIG. 3) are put on the sheet metal covers 13 (shown in FIG. 4). In each coil chamber, a thermal resistor 18 (see the detail view in FIG. 2) is mounted on the PCB to measure the chamber temperature. The temperature information will be used to compensate the environment temperature influence during operation. A small disk 19 made of permanent magnet is glued to tube 1. An actuation coil 20 is mounted on PCB 12. There is a space between actuation coil 20 and magnetic disk 19. A sinusoidal current is applied to actuation coil 20. Under the periodical magnetic force between excitation coil 20 and magnetic disk 19, tube 1 will make a back and forth swing, the frequency of the swing motion is equal to the resonant frequency of tube 1, and the excitation coil is set to tracing this frequency to form a resonant vibration. Forced vibration will take too much power to maintain. Swing motion is one of the vibration modes of tube 1 and generally is its lowest resonant frequency.

21 and 22 are two optical sensors. Light will emit from emitters 23 and received by receivers 24. The light will be partially blocked by tube 1. Sensing elements of the receivers will be able to monitor the motions of the legs of tube 1.

Figure 4:
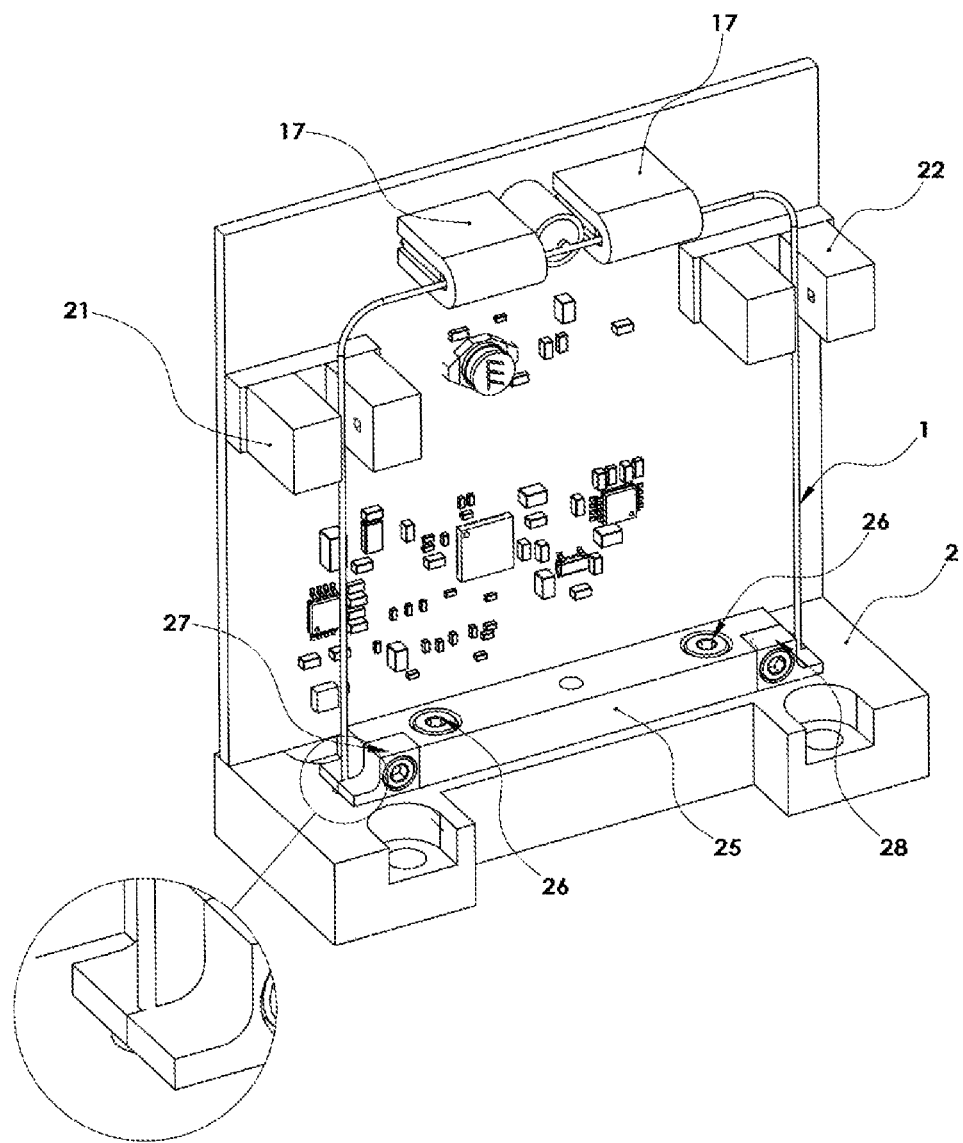
FIG. 4 is a perspective view of this invention from another angle.

FIG. 4 is showing this embodiment of invention from another angle. In FIG. 4, the tube support structure can be seen. As the tube is in a constant vibration, to avoid fatigue failure of the laser welding and provide a solid vibration support, this support structure is needed. In this structure, adjusting beam 25 is mounted to sensor base plate 2 by two screws 26. Tube 1 is accommodated by two slots on adjusting beam 25 with a little portion protrudes from the slots. Two mounting blocks 27 and 28 are screwed down to clamp the tube for a solid support. In the setup of the sensor, the position of tube 1 related to optical sensors 21 and 22 is important. Adjusting beam 25 will provide a way to adjust this position. This can be easily implemented by losing screws 26, adjusting the position of tube 1 by moving beam 25, and tightening screws 26. This supporting structure avoids the tedious brazing processing which will be used otherwise.

If there is a fluid flow through tube 1, under the action of the Coriolis force, the tube will make a periodical twist motion, it is a forced motion and the frequency of this motion is the same as the excitation frequency not its twist resonant frequency. Sensor electronics will treat the signals acquired by optical sensors 21 and 22, filter out the swing motion and calculate the phase difference between the two legs. The phase difference will be calibrated to represent the flow rate. It can be derived that the phase difference is directly proportional to the mass flow rate $$\varphi = C \cdot \omega \cdot \dot{m}, \quad (1)$$

where $\varphi$ is the phase difference between the two legs at the measuring locations;

$\omega$ is the excitation angular frequency, it is also the resonant swing frequency of the tube;

$\dot{m}$ is the mass flow rate flowing through the tube;

C is a constant related to the geometrical parameters and material of the tube.

Figure 5:
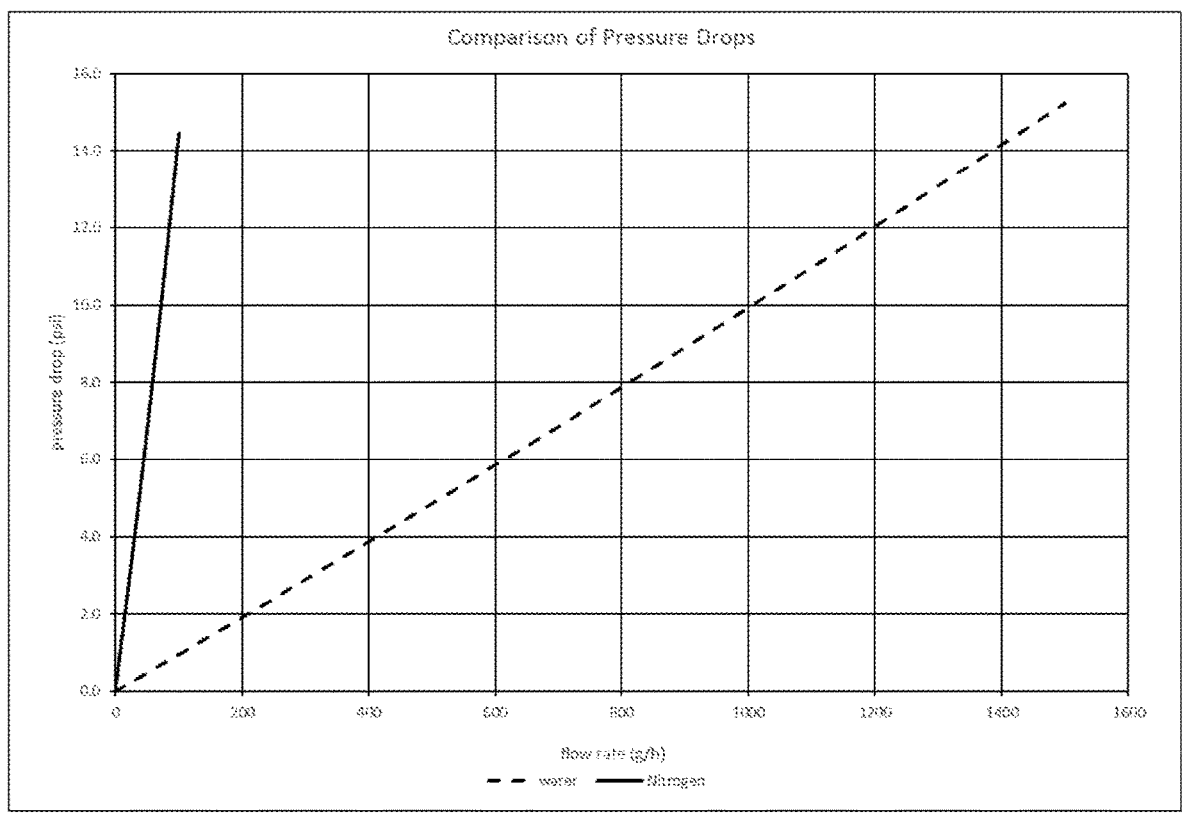
FIG. 5 is a chart showing the comparison of the pressure drops between water and Nitrogen.

For this embodiment of the invention, the tube inner diameter is 0.4 mm, the wall thickness is 0.05 mm, the tube is 148 mm long (43.5 mm wide and 54 mm high) and made of 316L. FIG. 5 is a comparison of the pressure drops when this sensor is flowing water and Nitrogen respectively. To be comparable, the capacity of a liquid sensor often is represented by the flow rate under 14.7 psi of pressure drop. It can be seen that when pressure drop is around 14.7 psi, the sensor can flow around 1500 g/h of water, but only a little more than 100 g/h of Nitrogen, equal to 1330 sccm. Suppose the full flow rate for this sensor to be 1500 g/h to measure water and 1300 sccm to measure Nitrogen; and the resolution, or the sensitivity of the Coriolis sensor (the minimum flow rates the sensor can detect with 100% certainty) of this embodiment of invention is around 1 g/h to measure water, or 13.3 sccm to measure Nitrogen, then the accuracy to measure water will be ±0.066% and ±1% to measure Nitrogen, a huge difference. In many applications, especially for semiconductor applications, the pressure drop under the full flow rate is even lower in favor of the thermal sensor, and this makes the application of the Coriolis sensor even more difficult.

The inefficiency of this sensor at low flow end can be compensated by its thermal measurement ability.

Figure 6A:
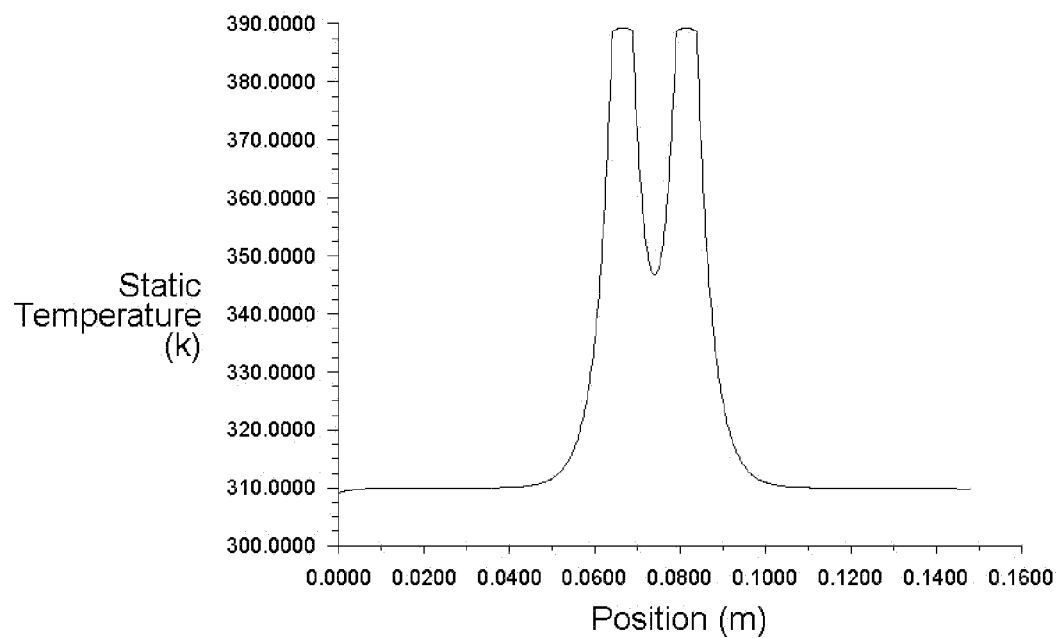
FIGS. 6A and 6B are charts showing the temperature distribution along the tube wall, without flow and with flow, respectively.
Figure 6B:
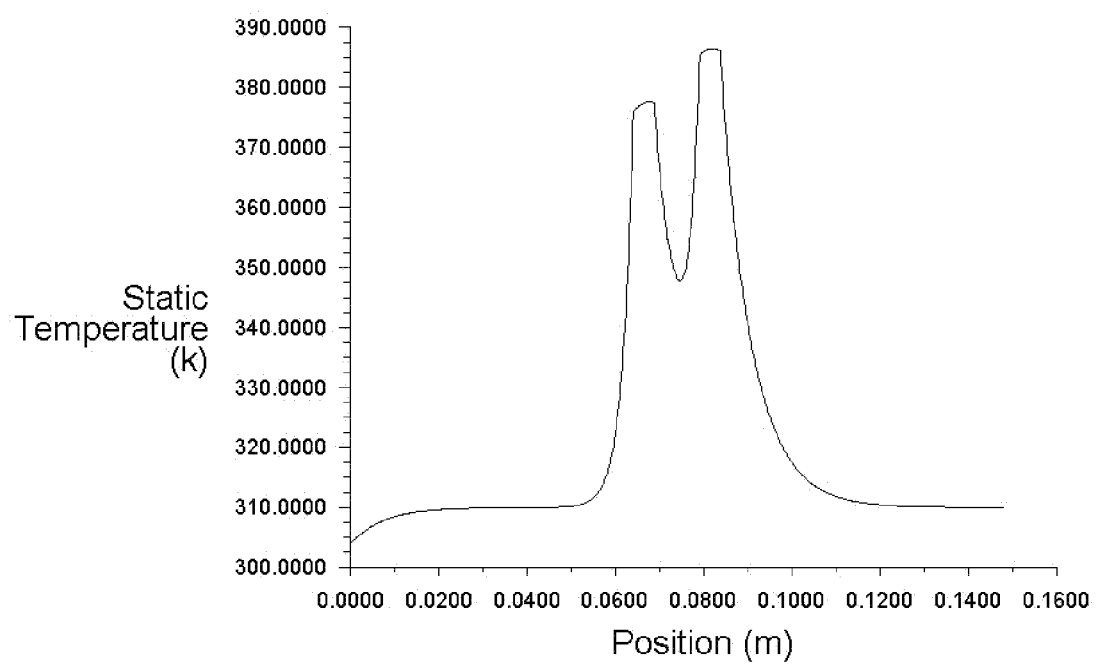
Figure 7:
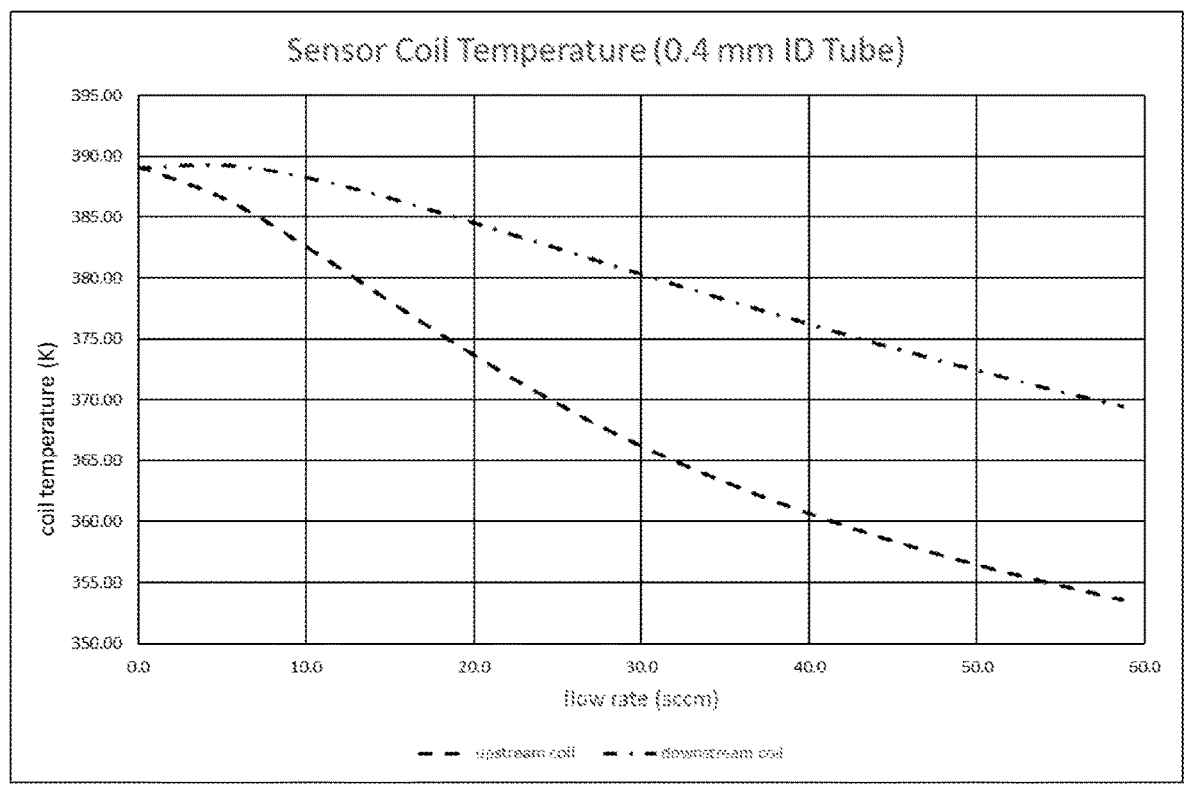
FIG. 7 is a chart showing the average temperatures of the coils versus the flow rates.

In the thermal measurement of the mass flow rate, coils 6 and 7 will be heated up. There are different schemes to do the heating, such as constant current, constant temperature or constant temperature drop. For the method of the constant current, a constant current is applied to both coils all the time. The temperatures of the coils will arise and change under the cooling of the flow fluid. The change is different between the upstream coil and the downstream coil. The CFD analysis results for the temperature profile of the tube wall is shown in FIGS. 6A and 6B. Without flow, as shown in FIG. 6A, the temperature reaches the peaks at the locations of coils 6 and 7. The two coils have the same temperature profiles. When there is a flow inside the tube, the cooler inlet gas will cool down upstream coil 6, and in the process, the gas will be heated up, when it reaches downstream coil 7, the temperature difference between the coil and the gas is smaller, the gas will take less heat from the coil (at the very beginning, the gas will give the coil some heat), this will keep the temperature of downstream coil 7 higher than upstream coil 6 (FIG. 6B). This temperature changing process with the increase of the flow rate is shown in FIG. 7. The coil temperatures used are their average temperatures.

The coil temperature change will result in its resistance change:

$$R=R_0[1+\alpha(T-T_0)], \qquad (2)$$

where: R and $R_0$ are the current and the initial coil resistances, respectively;

α is the temperature coefficient (1/K), for the resistant wire used, this value is around 0.0045;

T and $T_0$ are the current and the initial coil temperatures, respectively.

Figure 8:
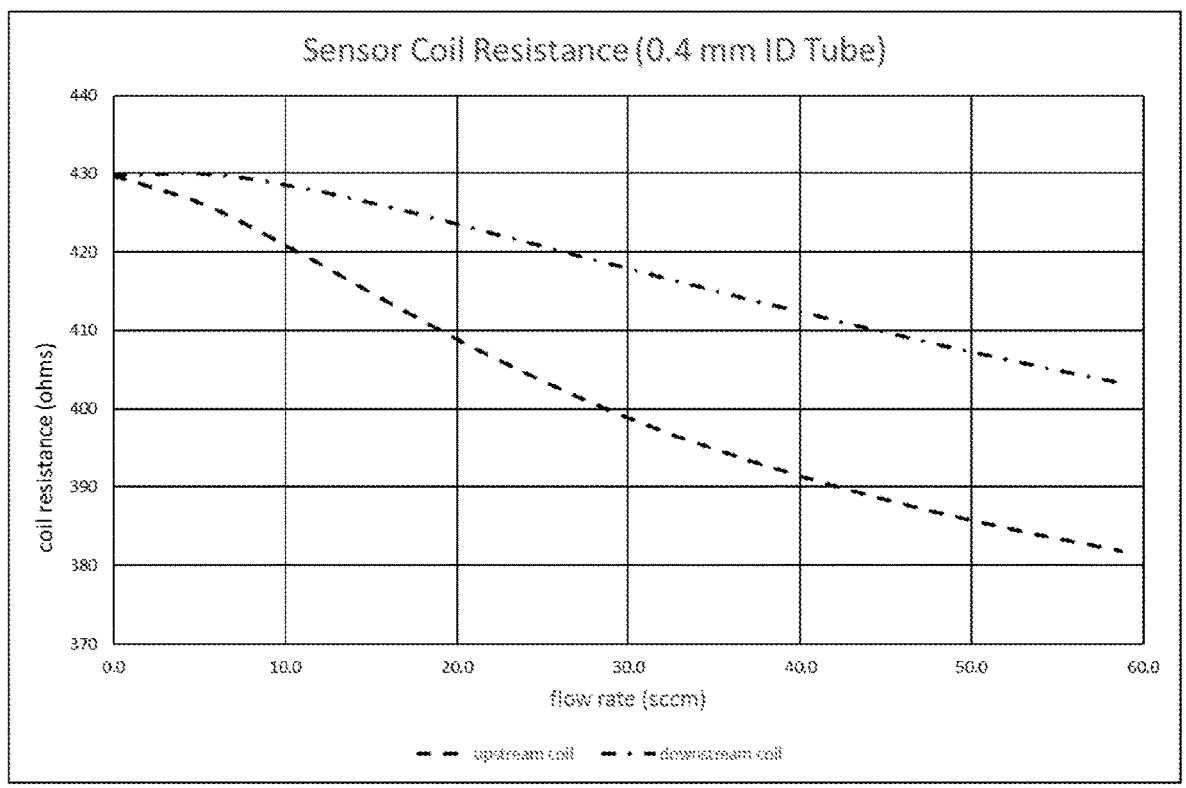
FIG. 8 is a chart showing the average resistances of coils as a function of the flow rate.

If we will assume that a constant 12-mA current i is applied to both coils and we also assume that the initial resistances for both coils are 300 ohms. Based on these values and Equation (2), the coil resistance change is showing in FIG. 8.

The voltage drops V across each coil can be calculated by $$V=i \cdot R, \qquad (3)$$

Figure 9:
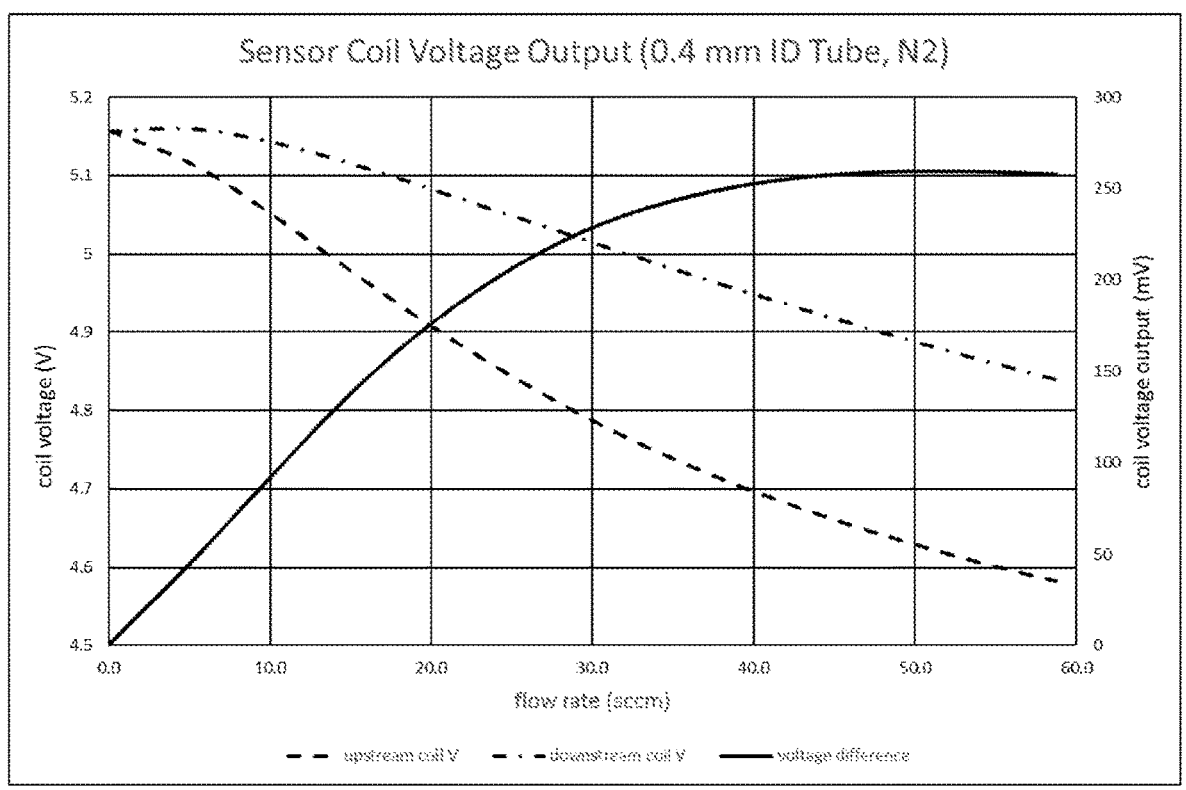
FIG. 9 is a chart showing the voltages of the coils and the voltage difference of the coils as a function of the flow rate.

They are plotted in FIG. 9 along with the voltage difference between upstream coil 6 and downstream coil 7. The voltage difference is used as the sensor output because it cancels some nonlinearities of the voltage drops of the two coils. It can be seen that the maximum flow rate of this thermal sensor is around 45 sccm, and the sensor output at full flow rate is around 250 mV. Generally, to be more accurate and to avoid overflow, we only use the portion close to straight line of the output, for example, the portion below 20 sccm. The output is still around 170 mV at 20 sccm, this is a quite strong signal, even at its 1% of the flow rate, that is 1.7 mV, it will be easy to be picked up by the sophisticated circuitry of nowadays.

Figure 10:
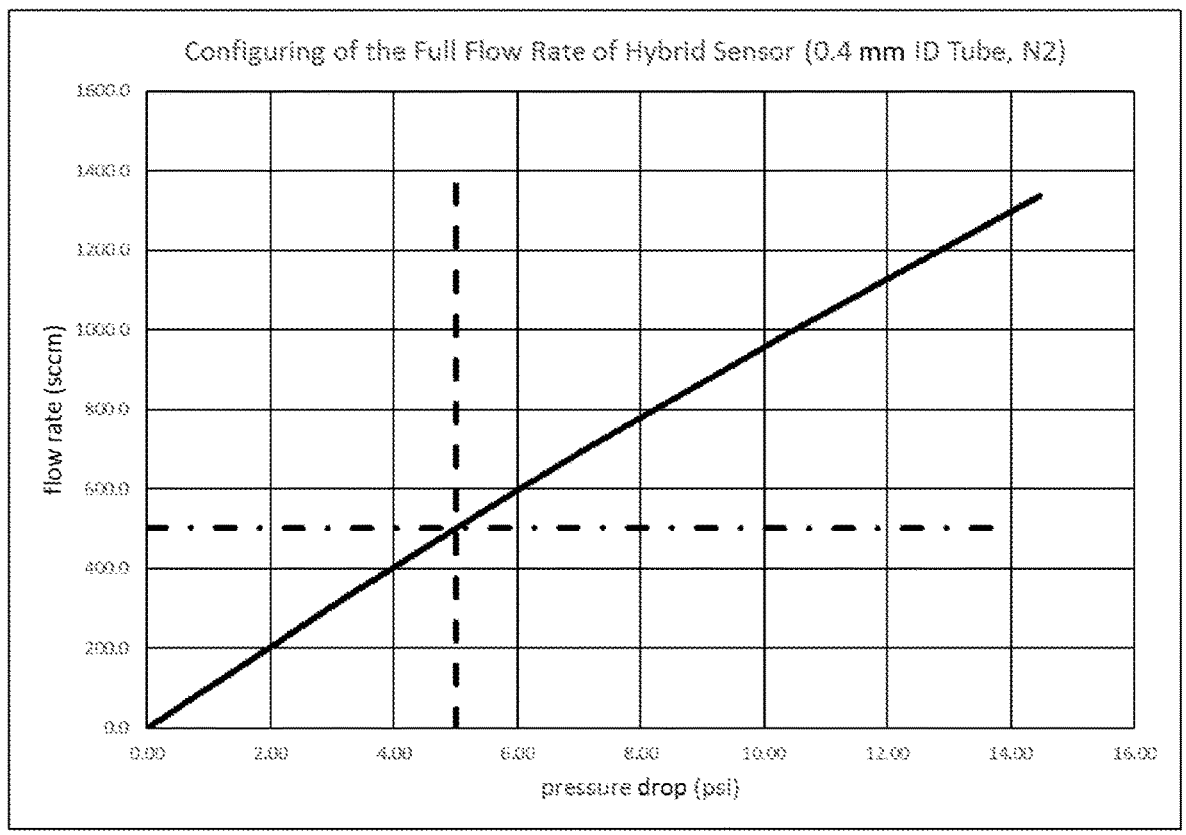
FIG. 10 is a chart showing the configuring of the full flow rate of the hybrid sensor for Nitrogen with 0.4 mm ID tube.

FIG. 10 shows how the full flow rate of the hybrid sensor is chosen. From the flow rate versus the pressure drop curve, choose the pressure drop around 5 psi (vertical hidden line), and at this pressure drop, choose the flow rate as 500 sccm (horizontal center line). Higher pressure drops, such as 14.7 psi, can be used and this will make the hybrid sensor specification better. But as a demonstration here, also, to be in line with the thermal sensors currently used in semiconductor business, 5 psi of pressure drop is chosen.

Figure 11:
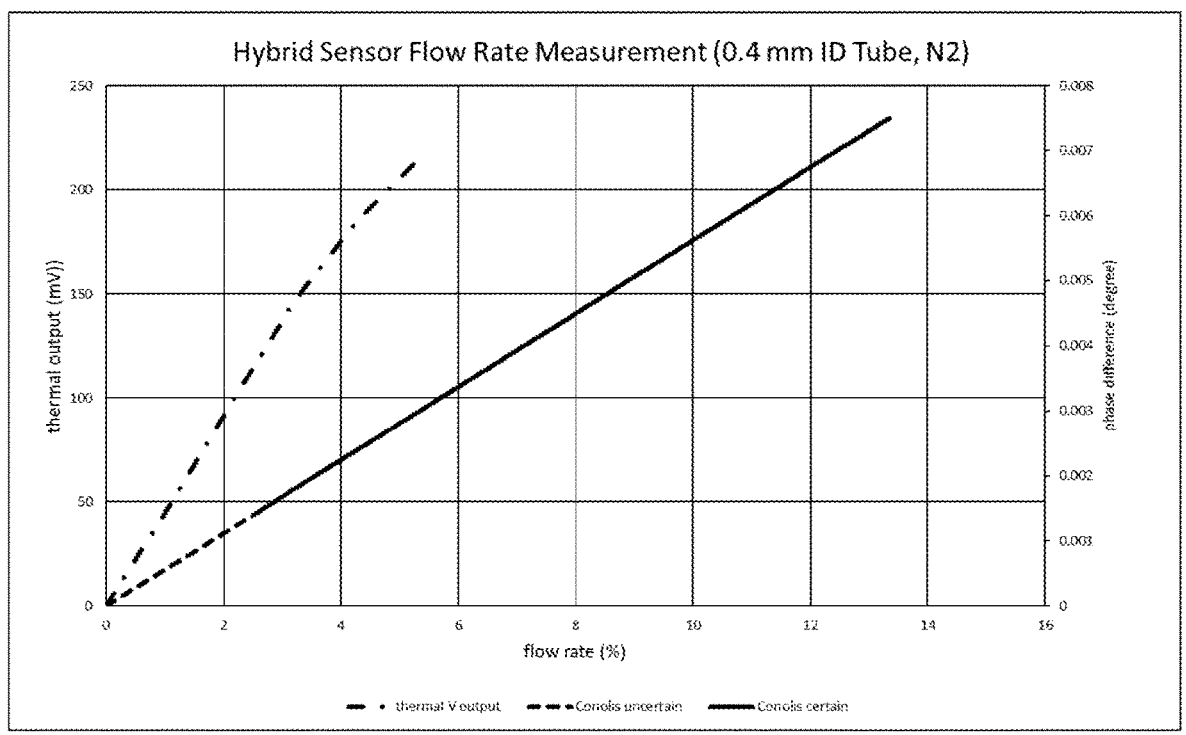
FIG. 11 is a chart showing the hybrid measurement of the flow rate for Nitrogen with 0.4 mm ID tube.

Once the full flow range is picked, as we know for this embodiment of the invention, the minimum flow rate for Nitrogen is 13.3 sccm, the lowest flow rate can be detected is 2.67% of full flow rate. Below 2.67%, we will use the thermal measurement. FIG. 11 shows how these two measurements are combined together. To see the detail, only the flow rate less than 14% of the full flow is displayed (75 sccm). From FIG. 11, we can see that below 2.67% of the full flow (13.3 sccm), the flow rate cannot be measured by the Coriolis method (shown in hidden line). For this portion, we use the thermal measurement (shown in center line). The thermal output needs to be calibrated with the Coriolis measurement results. For the thermal measurement part, conservatively, the resolution can be 1% of the full flow rate (20 sccm, see FIG. 9), that is 0.2 sccm. As we have set the full flow rate of this hybrid sensor as 500 sccm, the turndown ratio for this hybrid sensor is 500/0.2=2500:1! And the accuracy will be ±0.04%. Considering the errors introduced from other sources, the accuracy can reach ±0.1% with easy. If the total pressure drop is allowed to increase beyond 5 psi, this ratio is going to be even higher and the accuracy will be better.

The calibration of the thermal measurement can be implemented at any time. To do it periodically will eliminate the thermal sensor long-term stability issue.

When the hybrid sensor switches to other gas, although the thermal measurement is gas sensitive, but because it is calibrated by the Coriolis measurement, and which is not gas sensitive, the whole hybrid sense will be gas insensitive.

Figure 12:
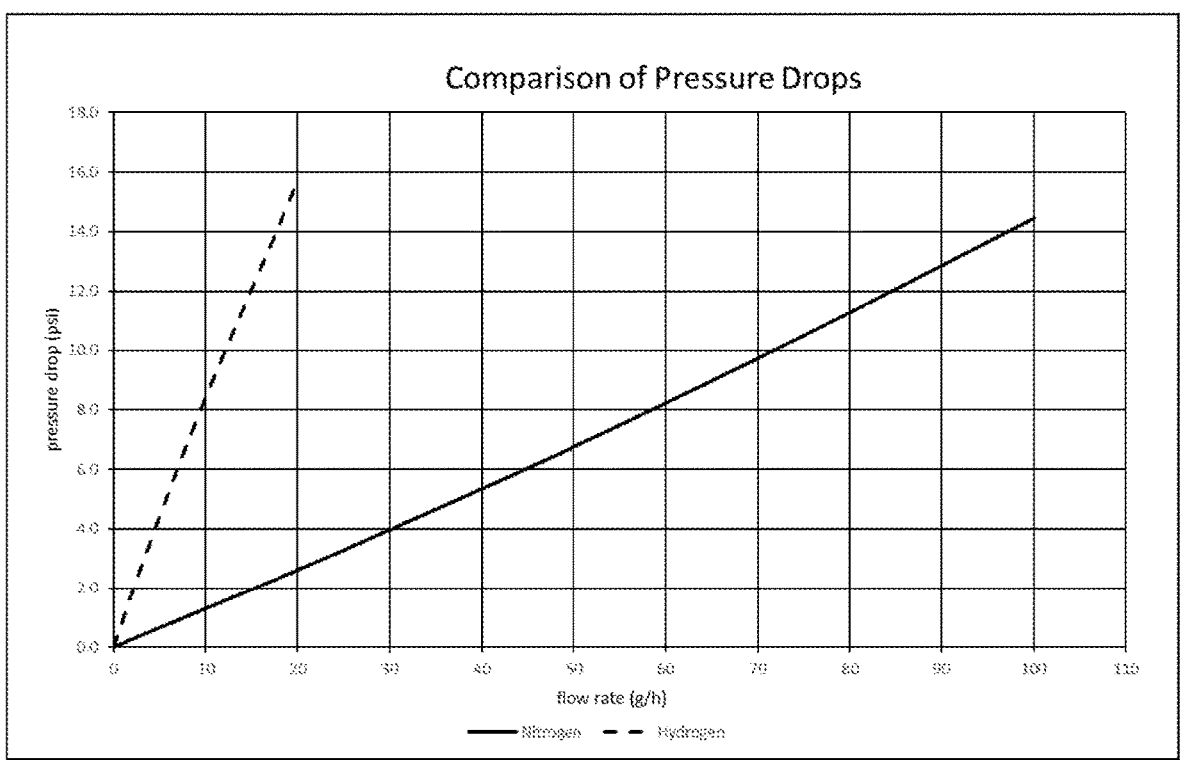
FIG. 12 is a chart showing the comparison of the pressure drops between Nitrogen and Hydrogen.

Nitrogen measurement is not the worst case for the Coriolis measurement, the worst case is the measurement of Hydrogen, Deuterium and Helium. Compare with the molecular weight of Nitrogen, which is 28.01, the molecular weight for Hydrogen is only 2.016, Deuterium is 2.014 and Helium is 4. The comparison of the pressure drops between Nitrogen and Hydrogen for this embodiment is shown in FIG. 12. For Nitrogen, the flow rate to reach 14.7 psi pressure drop is around 100 g/h, and it is 20 g/h for Hydrogen.

Moreover, the worse thing is the detectable minimum flow rate. As we mentioned before, this flow rate for Nitrogen is 13.3 sccm, but for Hydrogen, because of its low density, this detectable minimum flow rate is around 186.8 sccm (1 g/h). This is too high for many applications.

Figure 13:
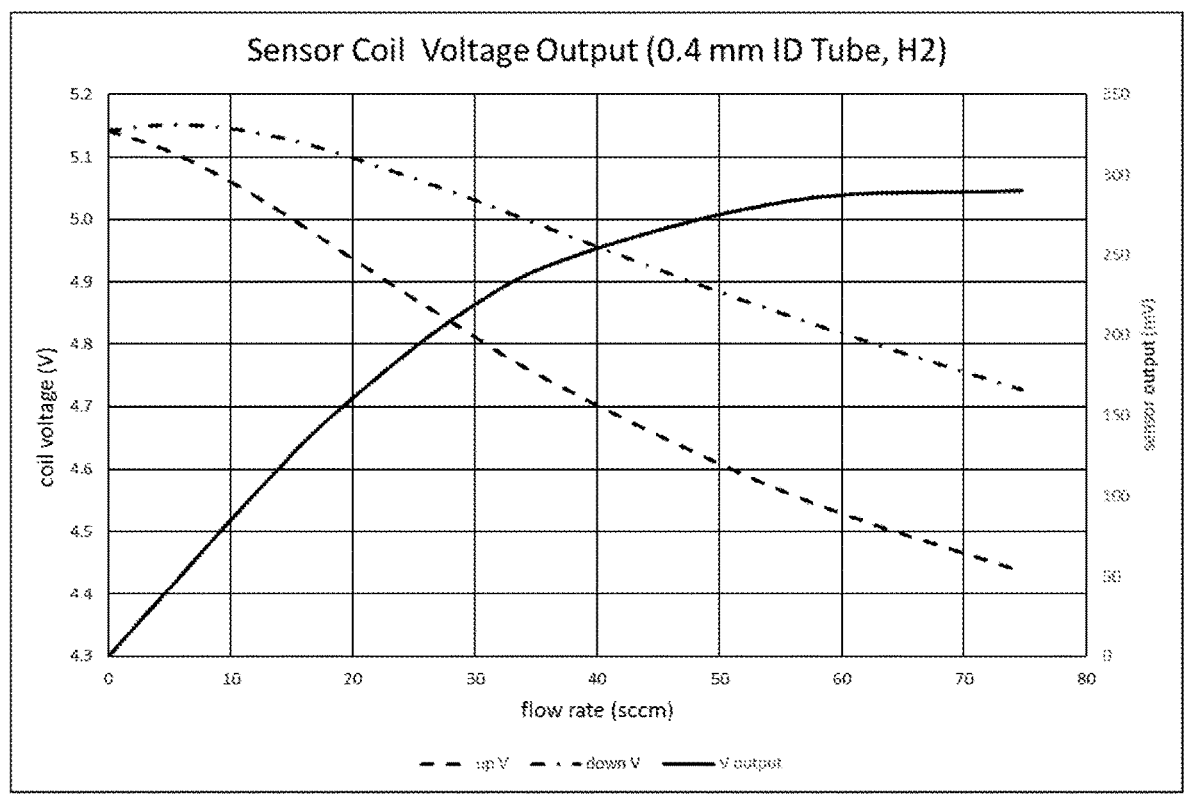
FIG. 13 is a chart showing the thermal output for Hydrogen with 0.4 mm ID tube.

The signal output of the thermal measurement of Hydrogen for this embodiment of this invention is shown in FIG. 13. The measurement range is not much higher than Nitrogen. The sensor output begins to be highly nonlinear after the flow rate is above 30 sccm and to be saturated after the flow rate reaches 60 sccm.

Figure 14:
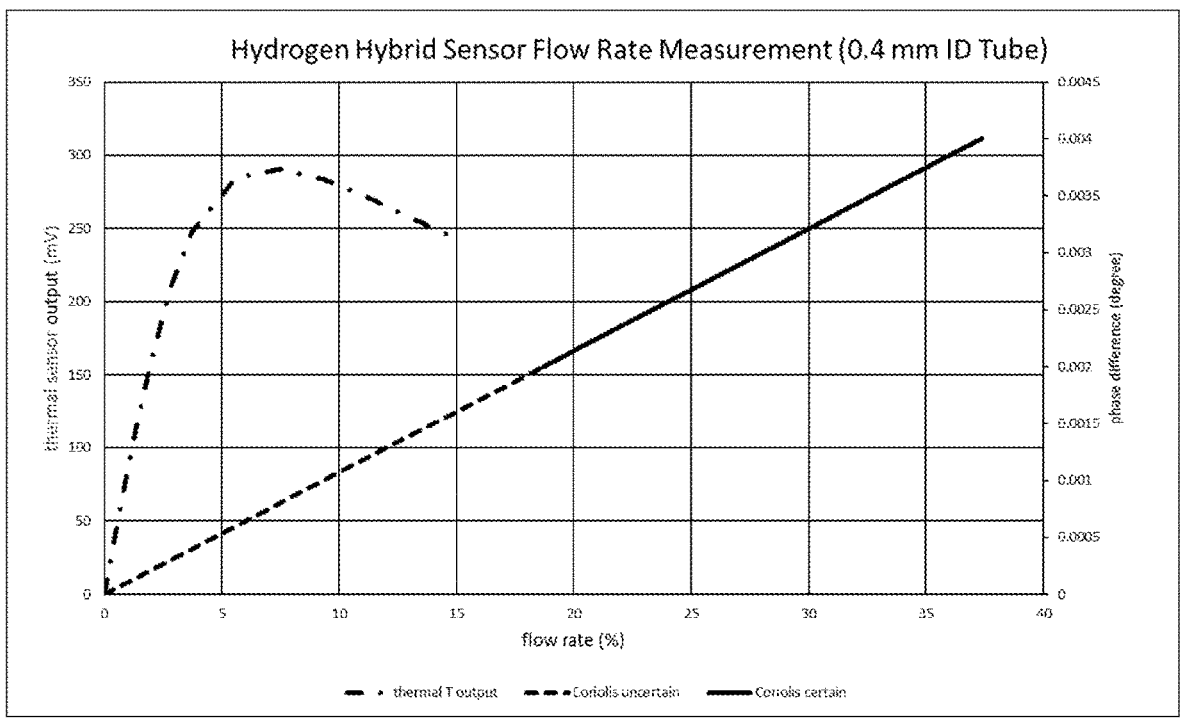
FIG. 14 is a chart showing the hybrid measurement for Hydrogen with 0.4 mm ID tube.

If the same the procedure used in the configuring of the hybrid measurement of Nitrogen is followed, the full flow rate will be 1000 sccm (only 5 g/h). Combining this with the thermal output shown in FIG. 13, a hybrid measurement of Hydrogen can be obtained as shown in FIG. 14. It can be seen that even with the help of the thermal measurement, this embodiment still cannot cover the whole range. There is no overlap between the Coriolis measurement and the thermal measurement. The flow rate between 6% to 18% (equal to 60 to 186.8 sccm of Hydrogen) cannot be decided.

The solution to this is the second embodiment of this invention. In this embodiment, the inner diameter of the flow tube is changed from 0.4 mm to 0.2 mm. When the tube is thinner, the detectable minimum flow rate for the Coriolis measurement is also lower, it will be around 0.16 g/h instead of 1 g/h. Convert it to Hydrogen, the minimum detectable flow rate with certainty becomes 30 sccm instead of 186.8 sccm.

Figure 15:
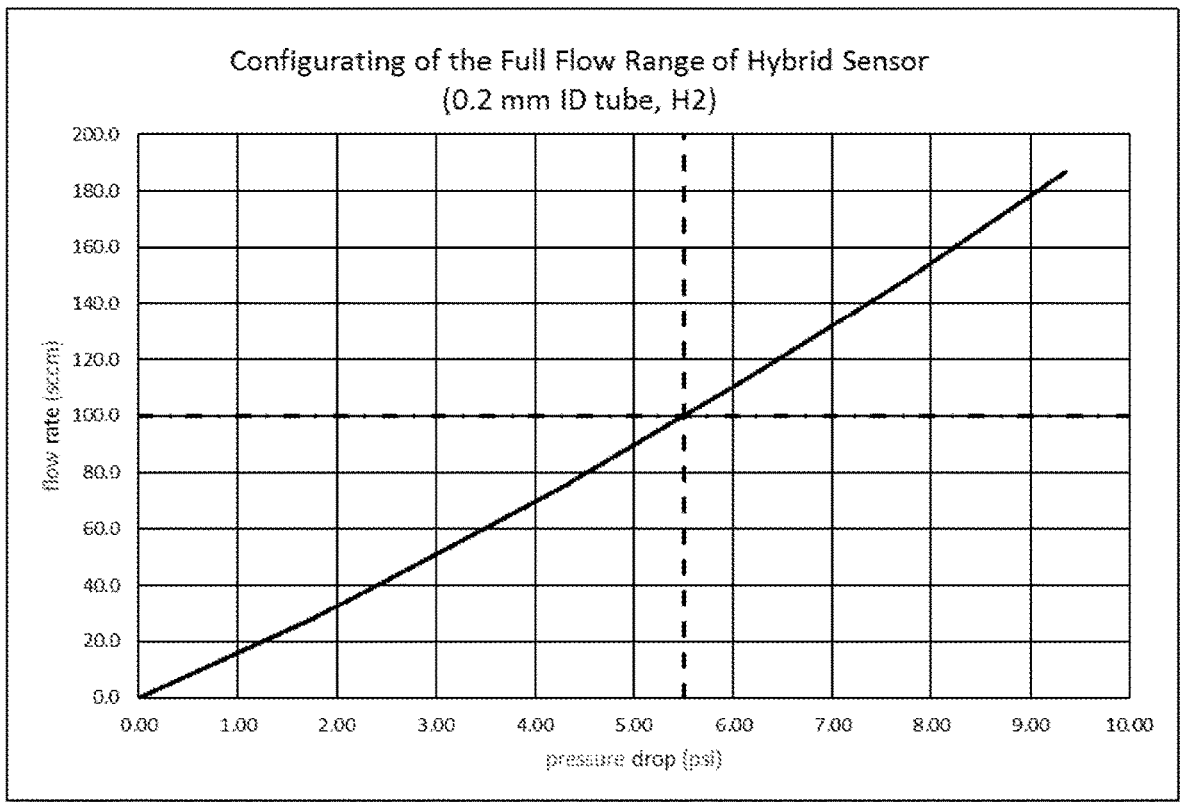
FIG. 15 is a chart showing the configuring of the full flow rate of the hybrid sensor for Hydrogen with 0.2 mm ID tube.

The selection of the full flow rate for Hydrogen with 0.2 mm ID tube is shown in FIG. 15. 100 sccm is selected at 5.5 psi pressure drop.

Figure 16:
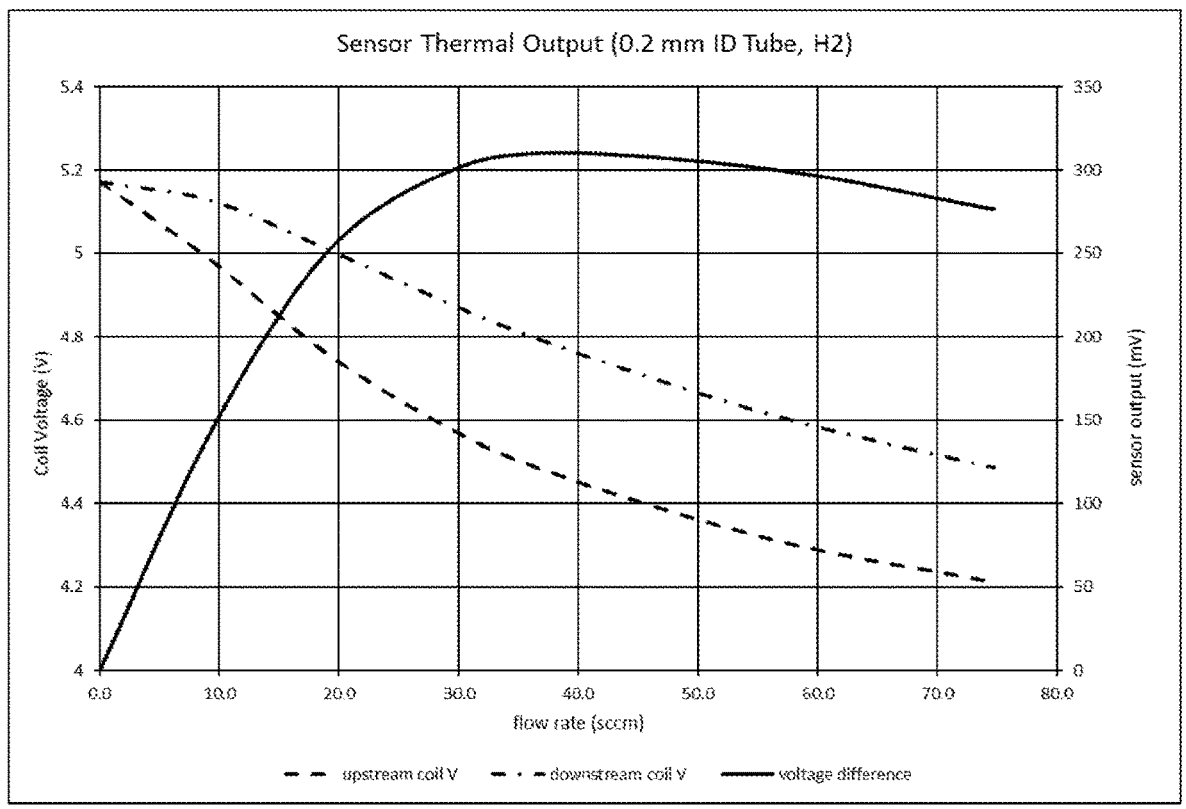
FIG. 16 is a chart showing the thermal output for Hydrogen with 0.2 mm ID tube.

The thermal output of the 0.2 mm ID tube for Hydrogen is shown in FIG. 16. The thermal output is useful up to 30 sccm. This will meet with the minimum flow rate of the Coriolis measurement.

Figure 17:
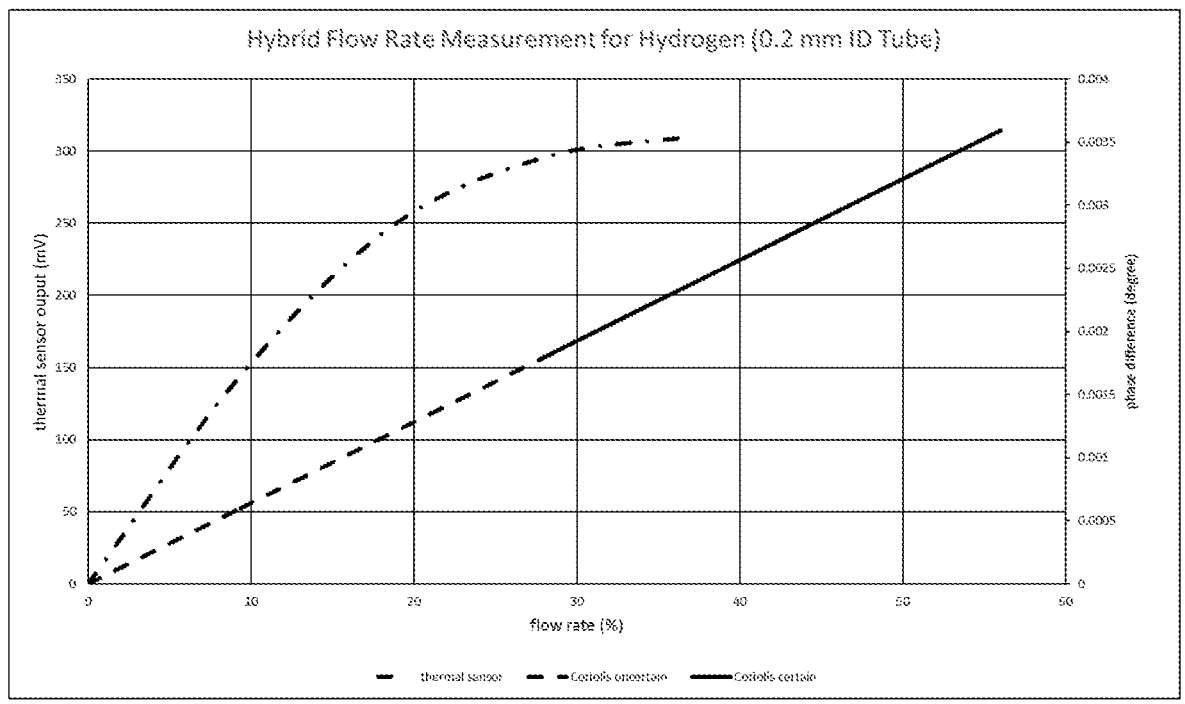
FIG. 17 is a chart showing the hybrid measurement for Hydrogen with 0.2 mm ID tube.

The hybrid measurement of Hydrogen with 0.2 mm ID tube is shown in FIG. 17. The thermal output will need some linearization, and this should not be too difficult. For accuracy, if 1% resolution, or 0.3 sccm (FIG. 16) is taken for the thermal measurement, the turn-down ratio can still reach 100/0.3=330:1 and the accuracy will be ±0.3% for this worst-case scenario.

When the flow rate is above 100 sccm for Hydrogen, Deuterium and Helium, and above 500 sccm for other gases (other low molecular weight gases are: Hydroxyl: 17.01; Ammonia: 17.02; water vapor: 18.02; and natural gas: 19, they all can be measured by the first embodiment of this invention), a laminal flow element (LFE, also called bypass or restrictor) is needed to split the flow. Only part of the flow is flowing through the hybrid sensor and the remain is flowing through the main flow path. Although the use of LFE will introduce another error source for accuracy, but in the design of the LFE, if the Reynolds number is low enough so as to keep the split ratio to be as constant as possible with the flow rate change, this error can be minimized. Considering that in the thermal flow measurement or the pressure-based flow measurement, LFE is used without exception. Also, the flow standard such as Mobloc system is also using LFE to split flow.

Figure 18A:
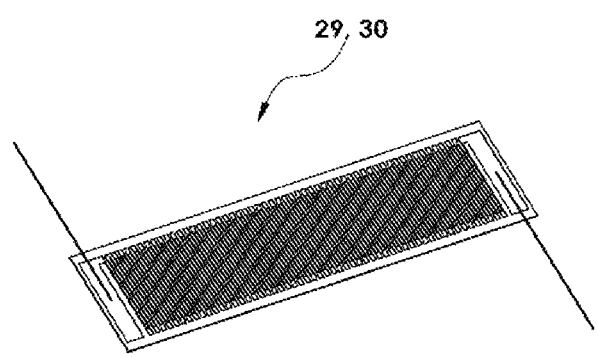
FIG. 18A is a perspective view of a flexible film resistor and FIG. 18B shows that the resistors are attached to the flow tube.
Figure 18B:
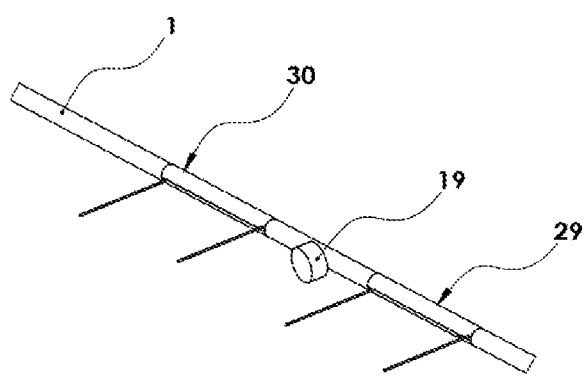

In another embodiment of this invention, the resistant wire coils 6 and 7 are replaced by flexible film coils 29 and 30 as shown in FIG. 18A. The resistant film made of platinum or similar is laser cut or etched to a resistor pattern. The film is (or was) attached to a polyimide or similar film base. Two leads will be spot-welded to each end of the resistor pattern. By using the thermal conductive adhesive, the flexible film coils 29 and 30 will be wrapped and attached to flow tube 1 as shown in FIG. 18B.

The hybrid mass flow sensor will keep the advantages of both Coriolis sensor and thermal sensor:

It is accurate. The turn-down ratio can be as high as 2500:1, even for Hydrogen measurement, the turn-down ratio can still reach 330:1;

It is gas insensitive. The sensor can be switched to any gas or mixture of gases at any time;

It is fast. The response depends on the response of Coriolis sensor;

It has the long-term stability;

Pressure drop is in line with the thermal sensor;

What is claimed is:

1. A hybrid mass flow sensor operating both on thermal and on Coriolis principle for measuring a wide range of flow rates comprising:

a stainless steel flow tube forming a U-shaped arrangement and having an inlet and an outlet; wherein the stainless steel flow tube airtightly installed in a base plate at the inlet and the outlet;

an upstream resistant coil and a downstream resistant coil wound on the stainless steel flow tube at a distal end of the U-shaped arrangement;

a magnetic disk arranged on the stainless steel flow tube at the distal end between the upstream and downstream resistant coils;

a Printed Circuit Board (PCB) mounted to the base plate:

an excitation coil installed on the PCB close to the magnetic disk without contact; and an upstream optical sensor and a downstream optical sensor surrounding portions of the flow tube without contact; wherein the upstream optical sensor is arranged between the upstream resistant coil and the inlet and the downstream optical sensor is arranged between the downstream resistant coil and the outlet; and wherein the PCB anchoring the optical sensors and the excitation coil.

* * * * *